Aug. 1, 1967  D. W. BIRDWELL  3,333,604

PULSATION REDUCER

Filed July 28, 1964

INVENTOR.
DEWIE W. BIRDWELL,
BY
Berman, Davidson & Berman
ATTORNEYS.

3,333,604
PULSATION REDUCER
Dewie W. Birdwell, 1917 Coleman Ave.,
Snyder, Tex. 79549
Filed July 28, 1964, Ser. No. 385,652
2 Claims. (Cl. 138—30)

This invention relates to a pulsation reducer for pump-actuated fluid systems.

While the invention is primarily devised for use in such high pressure fluid systems as car washer apparatus, wherein the pumps employed are usually of the high speed dual piston type, the invention is also applicable to other systems, employing other types of pumps, including rotary pumps.

In present car washer apparatus, employing high speed dual piston pumps, producing in the range of 3450 strokes per minute, and a correspondingly similar number of pulses or surges, at pressures in the range of 400–500 p.s.i., the accompanying vibration and noise is destructive and troublesome to customers. In fact, the vibration produced not only makes difficult the handling of the washer hoses in car washing operations, but substantially reduces their useful life, requiring frequent and expensive replacements. Further, the vibrations accompanying the operation of such car washers requires special and expensive installation, including the burying, in concrete, of the pipes leading to the hoses, and the more massive and expensive construction of the buildings, housing the car washers, which would otherwise be literally destroyed by the vibrations.

The primary object of the present invention is the provision of a pulsation reducer, which, when incorporated in hydraulic systems of the kind indicated above, reduces and substantially eliminates the destructive vibrations mentioned, so that quiet and non-destructive operation is obtained, together with long life for the hoses, and the resultant substantial reductions of operating expenses, including longer life for the system components, especially the pumps; and lighter constructed buildings, housing the systems, at less cost, are made feasible.

Another object of the invention is the provision of a device of the character indicated above, which is simple and inexpensive in construction, is easy to service, when necessary, and whose installation is quick and easy, and is readily done by an unskilled mechanic.

Figure 1:
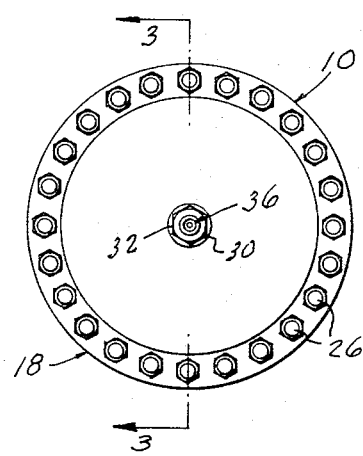
FIGURE 1 is an end view of a device of the present invention.
Figure 2:
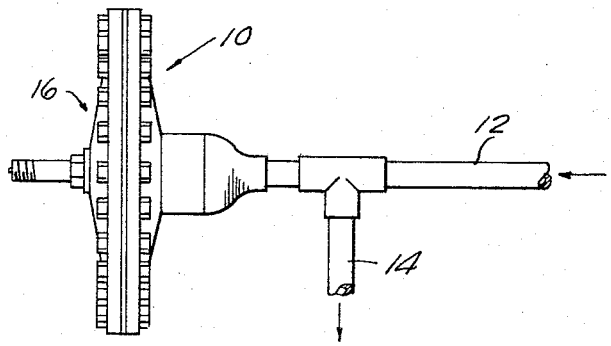
FIGURE 2 is a schematic side elevation thereof, showing the device installed in a high pressure hydraulic pump system.

Referring in detail to the drawings, the illustrated device 10 is shown connected to the output line 12 of a high speed pump actuated hydraulic system, the line 12 having a lateral branch 14, to which is connected utilization means, such as a car washer hose (not shown).

The device 10 comprises a circular, relatively flat housing 16, composed of two opposed, substantially similar heads 18 and 20, each having peripheral flanges 22, and flatly concave inner surfaces 24. Bolts 26, located at equally circumferentially spaced intervals, extend through the flanges 22 and secure the heads together.

The head 18 is formed, at its center, with a flat external surface 28 which is engaged by a sealing washer 30, against which a nut 32 bears. The nut 32 is threaded on the tubular body 34, of a Shrader type valve 36, which is threaded in an axial bore 38, formed through the center of the head 18. The valve body 34 has treaded therein a valve seat 40, through which works an outwardly extending valve stem 41, on whose intermediate part is a valve of the head 18. The valve body 34 has threaded therein a the inner end of the seat 40, in sealing relation to the passage through the seat, by a coil spring 44, which is compressed between the valve head 42 and a member 46 which bears against a stop 48, at the inner end of the bore 50 of the body 34. The valve 36 is provided for convenient introduction of and release of air under pressure into the housing 16, through the head 18, in order to provide a pneumatic cushion, as hereinafter explained.

The housing head 20 is formed, at its center, with a relatively large diameter circular axial opening 52, which is aligned with the valve body 34. An annular shoulder 54 is provided, at the inner edge of the opening 52, whose inner surface 56 is flush with a flattened central inner surface 58 of the head 20.

A removable perforated, heavy gauge disc 60 is seated in the opening 52, has a reduced diameter inner end portion 62, which fits in the opening of the shoulder 54, and has a flat inner surface 64, which is flush with the inner surface 58 of the head 20. The disc 60 is formed therethrough with a plurality of uniformly distributed bores 66, of relatively small diameter.

An external axial, internally threaded neck 68 surrounds the opening 52. The neck 68 can be in the form of a pipe collar welded to the head 20, or be formed integral therewith, when the head and the neck are a forging. A bell-shaped connector 70 has a reduced diameter inner portion 72 which threads into the neck 68, and has an inner end 73 bearing against the disc 60 and holding the disc against the annular shoulder 54. A shoulder 74, at the outer end of the threaded portion 72 bears against the outer end of the neck 68. At its outer end, the connector 70 has an axial, reduced diameter terminal 76, into which is adapted to be threaded, as indicated at 78, a high pressure output pipe or line 12, leading from a pump (not shown). At least one lateral pipe or line 14 is connected to the pipe 12, and leads to the point of utilization, such as a hose of a car washer (not shown).

A circular diaphragm 84, normally substantially of the same diameter as the housing heads 18 and 20, has a peripheral portion 86, clamped between the flanges 22 of the heads, the traversed by the bolts 26. In equilibrium, the diaphragm, as shown in phantom lines, in FIGUURE 2, is equidistant from the central areas of the iner surfaces of the heads 18 and 20, so as to severally define between itself and the heads 18 and 20, an air pressure or pneumatic cushion chamber 88 and a hydraulic or water pressure chamber 90.

Figure 3:
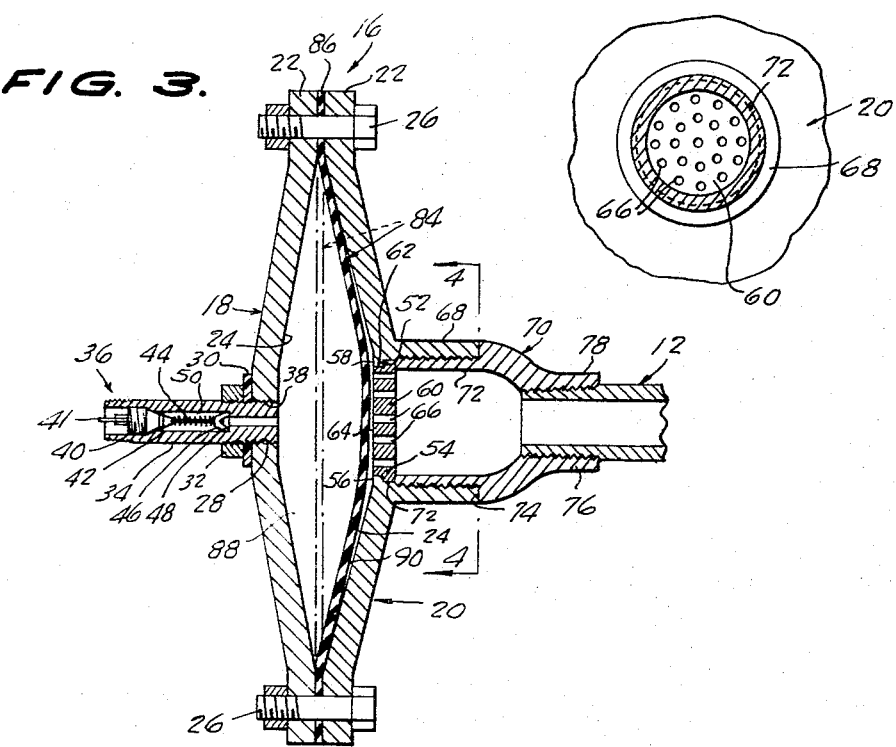
FIGURE 3 is an enlarged longitudinal section taken on the line 3—3 of FIGURE 1; and, FIGURE 4 is a fragmentary transverse section taken on the line 4—4 of FIGURE 3.
Figure 4:
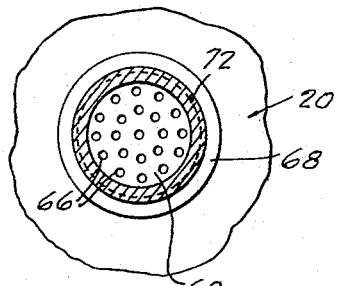

The diaphragm 84 is resilient and stretchable or elastic, and is preferably made of corded rubber or the equivalent, so that the diaphragm is capable of being moved and stretched to lie against the head 18 or against the head 20, as shown in full lines in FIGURE 3, according to an existing imbalance of pressures in the chambers 88 and 90.

In operation, the system involved being in operation, so that the hydraulic or water pressure in the chamber 90 is at a maximum, air pressure is applied to the valve 36, in order to produce a pneumatic cushion within the chamber 88, sufficient to counterbalance the hydraulic pressure within the chamber 90, to the extent necessary to reduce or eliminate pulsations present in the system and accompanying vibration. While a pressure gauge (not shown) can be used in conjunction with the valve 36, and another pressure gauge (not shown) used in conjunction with the hydraulic pressure line 12, for setting the necessary pressure within the pneumatic chamber 88, in practice this desired condition can be more easily and quickly obtained, simply by applying the available air pressure through the valve 36, until the noise and vibration, otherwise present in the system, is reduced to the desired degree. Where the device is to be installed at a location lacking an adequate source of air under pressure, the chamber 88 may be pre-pressurized, before the device is brought to the site of its installation.

An adequate pneumatic cushion having been obtained in the pneumatic chamber 88, by the injection of air pressure thereinto, as above explained, usually half the median pressure in the hydraulic chamber 90, the diaphragm 84 is in equilibrium. However, whenever a transient pulsation of hydraulic fluid takes place in the hydraulic pressure line 12, at a higher than medium pressure, a pulsation is produced in the chamber 90, which exceeds the median pressure, the diaphragm 84 is displaced toward the head 18, whereby the pneumatic cushion in the chamber 88 is compressed and absorbs the pulsation. As the pulsation subsides, the diaphragm 84 return toward its neutral or median position, and, where subsiding of the pulse produces a momentary drop below median pressure, in the hydraulic pressure line 12, the diaphragm can pass its median position, and bear against the head 20, as shown in FIGUURE 3.

In continuous operation, however, and due to the high speed and frequency of pulsations present in a hydraulic system driven by a high speed, high pressure dual piston pump, the pressure and counter pressures on the diaphragm 84, produced by the pulsations and the reset action of the pneumatic cushion, in the chamber 88, the diaphragm flutters to either side of its median position, with sufficient speed and force to reduce or eliminate the high speed pulsations, and hence, the destructive and noisy vibration of the system, which would otherwise be present.

What is claimed is:

1. A method of controlling low amplitude, high frequency in the range of 3450 cycles per minute, high pressure in the range of 400 to 500 pounds per square inch fluid pulsations in a line, said method comprising: providing opposed low volume, low altitude cavities having flatly concave inner surfaces and being separated by a deformable, resilient diaphragm normally occupying a medial plane between said cavities; applying gas pressure to one of said cavities to deform said diaphragm into conformity with the opposite cavity with said diaphragm supported by the walls of said cavity, bringing said gas pressure to approximately one-half the intended maximum pressure in the opposite cavity, and supplying fluid pulsations to the opposite cavity to displace said diaphragm, on each pulsation, substantially to its medial position against the pressure in said first cavity.

2. A pulsation reducer for high frequency in the range of 3450 cycles per minute, high pressure in the range of 400 to 500 pounds per square inch, low amplitude fluid pulsations comprising a pair of circular plates; a flexible, resilient diaphragm clamped between said plates, each of said plates being slightly deformed axially to define shallow cavities having flatly concave inner surfaces on opposite sides of said diaphragm; the central portion of one of said cavities being perforated to form a combination inlet and outlet for pulsating fluid and to support said diaphragm when said diaphragm is displaced by resilient fluid pressure in the opposite cavity into conformity with said flatly concave surface of said perforated cavity, the combined volume of the opposed cavities approximating the maximum volume of any intended pulsation.

References Cited

UNITED STATES PATENTS

| 2,324,701 | 7/1943 | Herman | 138—30 |
| 2,342,355 | 2/1944 | Mercier | 138—30 |
| 2,489,491 | 11/1949 | Johnson | 138—30 |

FOREIGN PATENTS 842,835  6/1939  France.

LAVERNE D. GEIGER, *Primary Examiner.*

T. L. MOORHEAD, B. E. KILE, *Assistant Examiners.*